United States Patent [19]

Yitzchaik et al.

[11] Patent Number: 6,033,774
[45] Date of Patent: Mar. 7, 2000

[54] SELF-ASSEMBLED SUPERLATTICES AND WAVEGUIDES PREPARED FOR USE THEREWITH

[75] Inventors: Shlomo Yitzchaik, Evanston, Ill.; Paul M. Lundquist, Bloomington, Minn.; Tobin J. Marks, Evanston, Ill.

[73] Assignee: Northwestern University, Evanston, Ill.

[21] Appl. No.: 08/857,769

[22] Filed: May 15, 1997

Related U.S. Application Data

[63] Continuation of application No. 08/355,639, Dec. 14, 1994, abandoned.

[51] Int. Cl.[7] .................................................. B32B 9/04
[52] U.S. Cl. ...................... 428/333; 252/582; 359/328; 359/329; 359/330; 359/332; 385/122; 385/129; 385/130; 385/131; 428/429; 428/451
[58] Field of Search .......................... 252/582; 359/328, 359/329, 330, 332; 385/122, 129, 130, 131; 428/333, 336, 405, 429, 447, 451

[56] References Cited

U.S. PATENT DOCUMENTS

| | | | |
|---|---|---|---|
| 4,539,061 | 9/1985 | Sagiv | 156/278 |
| 4,779,961 | 10/1988 | DeMartino | 252/299.01 |
| 4,792,208 | 12/1988 | Ulman et al. | 385/143 |
| 4,796,971 | 1/1989 | Robello et al. | 385/11 |
| 4,807,968 | 2/1989 | Leslie | 359/321 |
| 4,818,616 | 4/1989 | Milverton et al. | 428/411.1 |
| 4,828,758 | 5/1989 | Gillberg-LaForce et al. | 252/582 |
| 4,877,298 | 10/1989 | Teng et al. | 385/2 |
| 4,886,339 | 12/1989 | Scozzafava et al. | 385/141 |
| 4,900,127 | 2/1990 | Robello et al. | 385/141 |
| 4,935,292 | 6/1990 | Marks et al. | 428/220 |
| 5,156,918 | 10/1992 | Marks et al. | 428/447 |
| 5,317,657 | 5/1994 | Gallo et al. | 385/14 |

OTHER PUBLICATIONS

"Rational Design and Construction of Polymers with Large Second–Order Optical Nonlinearities. Synthetic Strategies for Enhanced Chromophore Number Densities and Frequency Doubling Temporal Stabilities," Hubbard, et al., *Mol. Cryst. Liq. Cryst.*, 1990, pp. 93–106.

"Chromophore–Functionalized Polymeric Thin–Film Nonlinear Optical Materials. Effects of in Situ Cross–Linking on Second Harmonic Generation Temporal Characteristics," Marks, et al., *Chemistry of Materials*, 1990. pp. 229–231.

"Chromophoric Self–assembled Multilayers. Organic Superlattices to Thin–Film Nonlinear Optical Materials," Li, et al., *J. Am. Chem. Soc.*, 1990, pp. 7389–7390.

*Primary Examiner*—D. S. Nakarani
*Attorney, Agent, or Firm*—Welsh & Katz, Ltd.

[57] ABSTRACT

One manner of construction of robust, thin film materials with large second-order optical nonlinearities is the covalent self-assembly of aligned arrays of high-$\beta$ molecular chromophores into multilayer superlattices. the dispersion of the large second harmonic generation (SHG) response in a self-assembled (SA) film containing stilbazolium chromophore building blocks is disclosed, as well as the fabrication of SHG waveguides with such materials.

5 Claims, 6 Drawing Sheets n = 0, 2

SELF-ASSEMBLED SUPERLATTICES AND WAVEGUIDES PREPARED FOR USE THEREWITH

This application is a continuation of U.S. application Ser. No. 08/355,639 filed Dec. 14, 1994, now abandoned.

FIELD OF THE INVENTION

This invention relates to materials with nonlinear optical properties, waveguides and the methods for the preparation of such materials and waveguides.

BACKGROUND OF THE INVENTION

A new approach to the construction of second-order nonlinear optical (NLO) materials has been described in U.S. Pat. No. 5,156,918. This method involves the covalent self-assembly of intrinsically acentric multilayers of high-$\beta$ chromophores on inorganic oxide substrates. Such robust thin film superlattices exhibit high second harmonic generation (SHG) efficiencies with $\chi_{zzz}$ values for 25 Å thick monolayers of $5-7 \times 10^{-7}$ esu at $\hbar\omega=1.17$ e V. This level of response is higher than that of conventional inorganic oxides such as $LiNbO_3$ and rivals or exceeds that of the most efficient poled polymers and acentric Langmuir-Blodgett films. Importantly, the self-assembled thin films are thermodynamically equilibrated systems and thus do not require an external aligning electric field to establish an acentric environment. This property represents a major processing advance over poled NLO polymers where inducing and completely stabilizing net chromophore alignment has been shown to be difficult. In addition, the present self-assembled chromophoric thin films are thermally and mechanically very robust—more so than typical chromophoric Langmuir-Blodgett films.

SUMMARY OF THE INVENTION

Optical waveguides composed of a combination of self-assembled thin films and optically linear layers can be used in virtually all of the traditional applications of general nonlinear waveguides. Such waveguides can be used for frequency conversion, which provides a highly compact source of light of wavelengths not available from lasers. Frequency conversion possibilities include frequency doubling and tripling (harmonic generation), sum and difference generation, and parametric amplification. Such frequency converting waveguides can be conveniently integrated into electro-optical circuitry. The high optical nonlinearity of the SA (self-assembled) layers can also be used for various types of optical modulation. Optical modulators can be designed from such materials, and interferometric phase modulators can be used as optical switches.

Therefore, an object of the subject invention is the preparation of efficient thin film-based SHG materials by the incorporation of NLO chromophores into covalently interlinked multilayers of self-assembled films.

Another object of the subject invention is an alternate method of preparation of thin film NLO materials utilizing a sequential construction of covalently self-assembled chromophore-containing multilayer structures.

Yet another object of the subject invention is the incorporation of such NLO films into an efficient waveguide.

These and other objects are attained in accordance with the subject invention, wherein a superlattice NLO material and method for preparing such a superlattice NLO material as shown in FIG. 1 is employed, where the basic siloxane technology in a preferred embodiment follows from reactions developed by Sagiv and taught in U.S. Pat. No. 4,539,061. Noteworthy features include the use of a stilbazole chromophore precursor in which the layer-building quaternization reaction simultaneously affords a high-$\beta$ chromophore center and readily monitored changes in the optical spectrum. In addition, soft, polymeric layers are introduced transverse to the stacking direction to enhance structural stability. The course of multilayer evolution on clean $SiO_2$ substrates is readily monitored by uv-visible spectroscopy (growth of the chromophore absorption); XPS spectroscopy (initial diminution of Si, O signals; growth and persistence of I, C, N signals); advancing contact angle measurements, which are in agreement with the expected properties of the surface functionalities; preliminary ellipsometry measurements, which are in accord with expected dimensions (approximate sublayer thicknesses in the notation of Scheme V: $C_pCh \approx 22$ Å; $Si \approx 12$ Å; $PVA \approx 10$ Å); and NLO characteristics. ($C_p$=coupling spacer; Ch=chromophore; PVA=polyvinylalcohol) The multilayer structures adhere strongly to glass, are insoluble in common organic solvents as well as strong acids, and can only be effectively removed by diamond polishing.

The films of the subject invention may be used in fabricating waveguides through the provision of a thin layer of the self-assembled material on a substrate capped with a transparent linear inorganic guide material, such as $TiO_2$ or organic material such as polystyrene. The linear guide thickness is approximately 5–500× the thickness of the NLO layer. The NLO material can be grown on the substrate, while the linear guide material may be deposited by chemical vapor deposition methods if inorganic, or by spin coating, if organic materials are used.

Further objects of the invention, together with additional features contributing thereto and advantages occurring therefrom, will be apparent from the following description of one embodiment of the invention when read in conjunction with the accompanying drawings wherein:

DETAILED DESCRIPTION OF PREFERRED EMBODIMENTS OF THE INVENTION

Figure 1A:
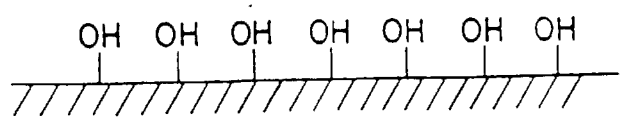
FIGS. 1(a)–1(d) show the general steps in the self-assembly technique of the subject invention for preparing NLO materials.
Figure 1B:
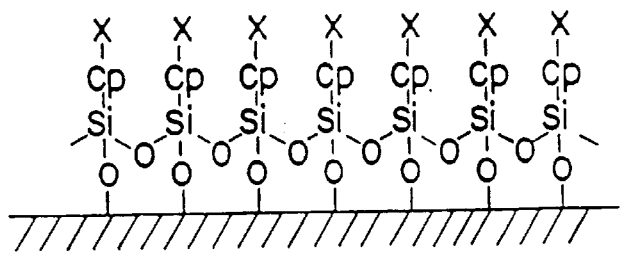
Figure 1C:
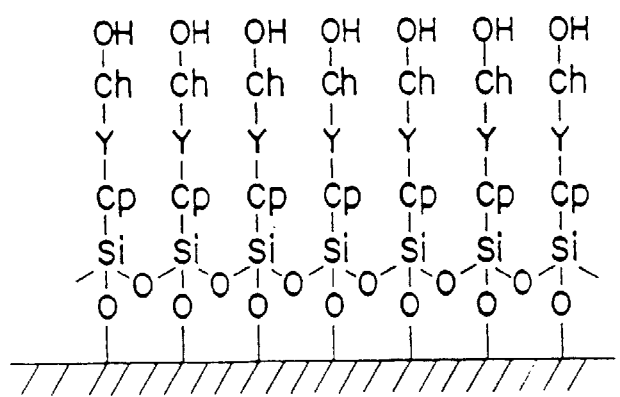
Figure 1D:
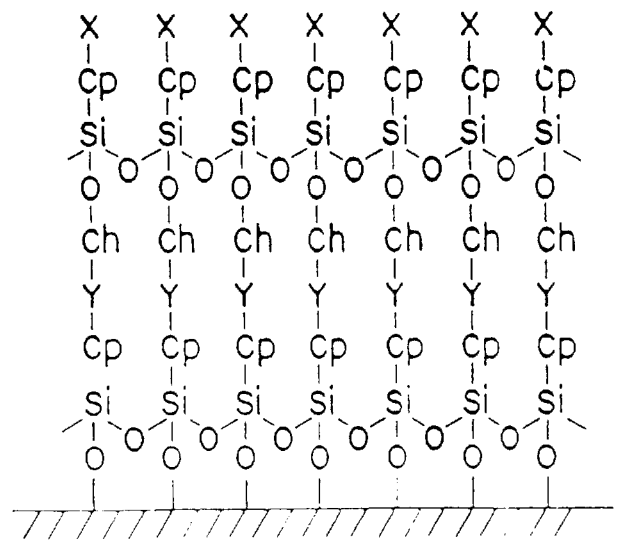

As set forth in FIGS. 1(a)–(d), the covalently linked NLO layers of the subject invention are formed by first preparing a defined substrate which comprises in general a surface having polar reactive groups, such as a hydroxyl (—OH) group.

The key step in the process comprises first forming a monolayer of molecules having a terminal polar group at one end, and a non-polar one at the other end of the molecular or at any other position along the molecule, and after forming the first compact monolayer by self-assembly on the defined substrate; activating the monolayer by introducing polar sites for the anchoring of an additional monolayer on top of the activated one, of similar nature as the first one; and repeating the activation and application of a further monolayer until the desired number of layers is attained. For example, the activation can be achieved by using bifunctional surfactant provided with a terminal non-polar function that may be chemically modified into a polar group during the activation step.

Bifunctional monolayer-building components should conform to the following general requirements:

Molecules that are structurally compatible with self-association into compact ordered arrays:

(a) Rod-like molecules containing elongated nonpolar (hydrophobic) moieties, such as derivatives of long chain saturated and unsaturated hydrocarbons and fluorocarbons, steroids, and other elongated polycyclic compounds.

(b) Disk-like, flattened molecules, such as derivatives of sugars, crown ethers, phthalocyanines, porphyrins, and any other aliphatic or aromatic molecule containing a large cyclic or polycyclic moiety.

Molecules of type (a) or (b) containing one or several polar "head" groups (active groups) that bind to polar solid substrates, and one or several non-polar groups (inert groups) that cannot bind to substrate surfaces or to monolayer covered surfaces, but are chemically convertible into appropriate active groups via appropriate surface reactions performed on the compound in the absorbed state. The requirement for nonpolar functions exhibiting inert-active dual character is necessary to ensure that the monolayer-to-surface anchoring proceeds through the polar head groups only, that the molecules assume proper orientation in the film and that the adsorption process stops with the completion of a well-defined monolayer film, while providing a route for triggering the continuation of the process under conditions of precise external control.

The monolayer-to-substrate and monolayer-to-monolayer mode of binding may be covalent, ionic, hydrogen bridge, or complex formation, the only special requirement being that the strength of binding be compatible with the conditions of the subsequent chemical reaction employed for the activation of the non-polar function.

Solids suitable as substrates for anchoring self-assembling monolayers should conform to the following requirements: any solid material exposing a high energy (polar) surface to which monolayer forming molecules can bind by any of the binding modes mentioned above. These may include: metals, metal oxides such as $SiO_2$, $TiO_2$, $MgO$, and $Al_2O_3$ (sapphire), semiconductors, glasses, silica, quartz, salts, organic and inorganic polymers, organic and inorganic crystals and the like.

The fluid phase containing the monolayer forming molecules, from which adsorption is performed, may be any fluid, i.e., solutions in organic or aqueous solvents, the melt of the adsorbate, or the vapor phase of the adsorbate.

Typical suitable molecules for use in the construction of such multilayer films are, for example, (a) normal paraffinic long chain molecules with hydrocarbon chains longer than 12 carbon atoms, containing a transoid ethylenic double bond at any position along the chain, and substituted at one end of anyone of the polar anchoring groups mentioned below; (b) as (a), but partially or fully fluorinated chains, starting with 8 carbon atoms; (c) as (a) or (b), but containing more than one ethylenic double bond; (d) as (a) or (b), or (c), but replacing the double bond by acetylenic triple bond or a terminal diacetylene group; (e) as (c), but replacing one double bond by an acetylene triple bond or a diacetylene group; (f) as (a) or (b), but replacing the double bond by a terminal non-polar function, which may be any of the functional groups listed below; (g) cholestane and cholestene derivatives substituted at one end (position 3 for example) by any one of the polar anchoring groups listed below, and containing an ethylenic or acetylenic group in the paraffinic side chain; (h) as (g) but replacing the double or the triple bond by a terminal non-polar function on the side chain, which may be any of the functional groups listed below; (i) androstane and androstene derivatives substituted at one end of the elongated polycyclic backbone by a polar anchoring group and at the other end by a non-polar functional group. The polar and non-polar groups may be any of the groups listed in the respective groups below; (j) phospholipids and glycerol long chain derivatives containing one, two, or three paraffinic chains per molecule, substituted at the ends (of one or more of the chains) by any of one of the non-polar functional groups listed below; (k) cyclodextrin derivatives provided on one side of the ring with non-polar substituent groups of the type listed below; (l) porphyrins and phthalocyanines substituted with polar anchoring groups and non-polar functional groups.

In the preferred approach, non-centrosymmetric structures having a very high degree of chromophore alignment, which is acentric by definition, comprise the starting point. By this approach, the chromophore molecules in solution are given some organizational "help" by coupling their molecular functionalities with functional groups on the surface. Inorganic oxides (in the form of crystals or thin films) are chosen as the desired substrates because oxides yield satisfactory hydrophilic metal hydroxyl groups on the surface upon proper treatment. These hydroxyl groups react readily with a variety of silyl coupling reagents to introduce desired coupling functionalities that can in turn facilitate the introduction of organic high-β NLO chromophores. This sequential procedure requires one step which attaches the reactive silyl groups to the hydroxyl surface, and a second which attaches the chromophore to the silyl surface. The separation of the functional groups involving these two steps is necessary to avoid a polymerization reaction in the direction away from the surface. The general strategy of the above procedure is summarized below, where Cp and Ch represent coupling spacers and high-β chromophores, respectively.

The choices of Cp has a great degree of flexibility, and include a bifunctional reagent having two points of reactivity at opposite sides of the molecule. In the preferred embodiment one side has reactive —$Sil_3$, —$SiBr_3$, —$SiI_3$, —$Si(OR)_3$ (R=a propyl group or —$Si(NR_2)_3$ groups (R=a propyl). Other embodiments might have —$CO_2H$ or —SH groups. The other end of the molecule should have an electrophilic but reactive group such as an alkyl or aryl halide or sulfonate. In the preferred embodiment it is a propyl halide.

Figure 4A:
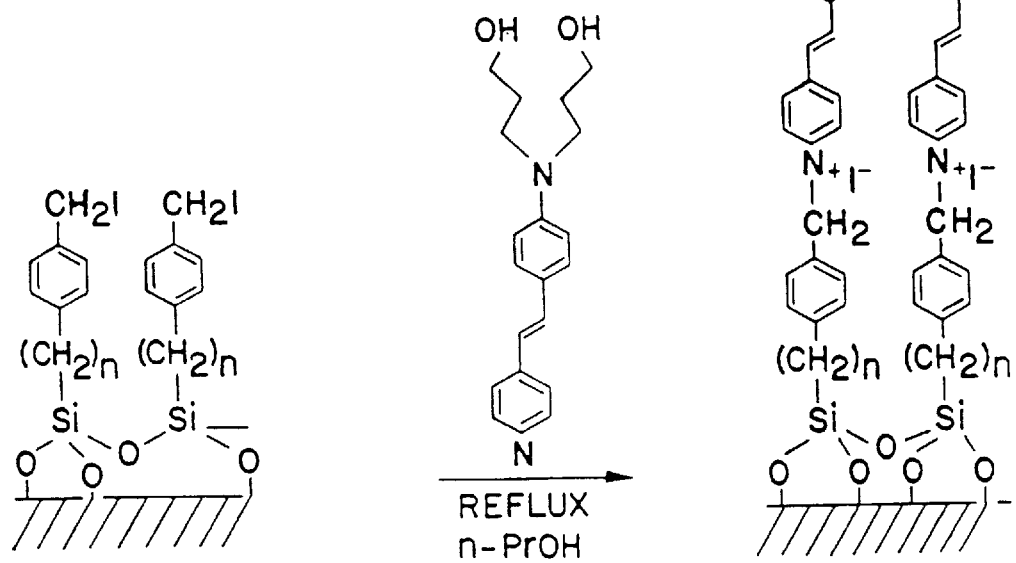

The choice of Ch is rather limited because most good charge transfer chromophores are donor-acceptor pairs having amino or substituted amino groups combined with cyano or nitro groups. The chromophore layer is the key component that gives rise to the NLO properties. It must also be bifunctional, with one end reacting preferentially with the exposed reactive end groups of the previously attached/deposited coupling layer. The preferred chromophore is shown in FIG. 4(a). Other possible chromophores are shown below. The chromophore used should have high β values (molecular NLO coefficient)

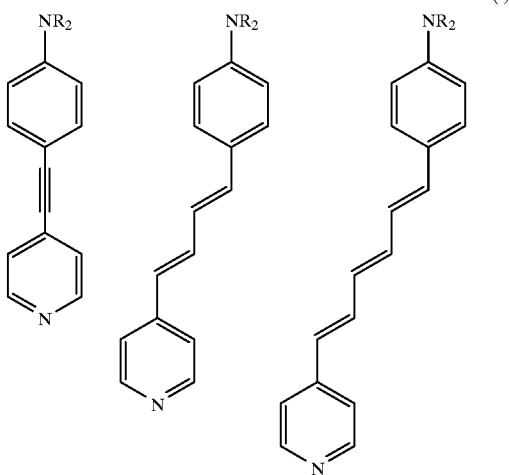

(I)

along the long axis of the chromophore and preferably is a stibazolium based compound. In the preferred embodiment, the other end of the chromophore molecule has alcohol groups (CH$_2$OH). Also possible would be amine (—CH$_2$NH$_2$), olefin (—CH═CH$_2$), or other reactive groups. These are for joining the chromophore layer to the next layer(s) to be deposited on top of them: the structural layers. Amino groups allow the introduction of other functionalizations but cyano and nitro groups are essentially a "dead end" from a synthetic point of view (i.e., have no available reactive functionality). Therefore, a group or structure which has the desired electron acceptor properties, and also has synthetic flexibility must be identified. The pyridinium structure possesses both of these characteristics. The nonaromatic analog to the pyridinium cation, trimethylammonium, (—N$^+$Me$_3$ group) has an electron withdrawing parameter $\sigma_p$=+0.82–0.96 derived from Hammett free energy relationship which is even larger than that of the nitro group ($\sigma_p$=+0.81), the best acceptor currently being used in organic NLO materials. Moreover, while the nitro and cyano groups are monofunctional groups, the pyridine structure has bifunctional properties (electron withdrawing and synthetic bonding abilities). These characteristics enable the incorporation of the pyridinium structure onto the surface without blocking subsequent layer formation and hence allow great flexibility in the molecular architectural design.

Figure 5:
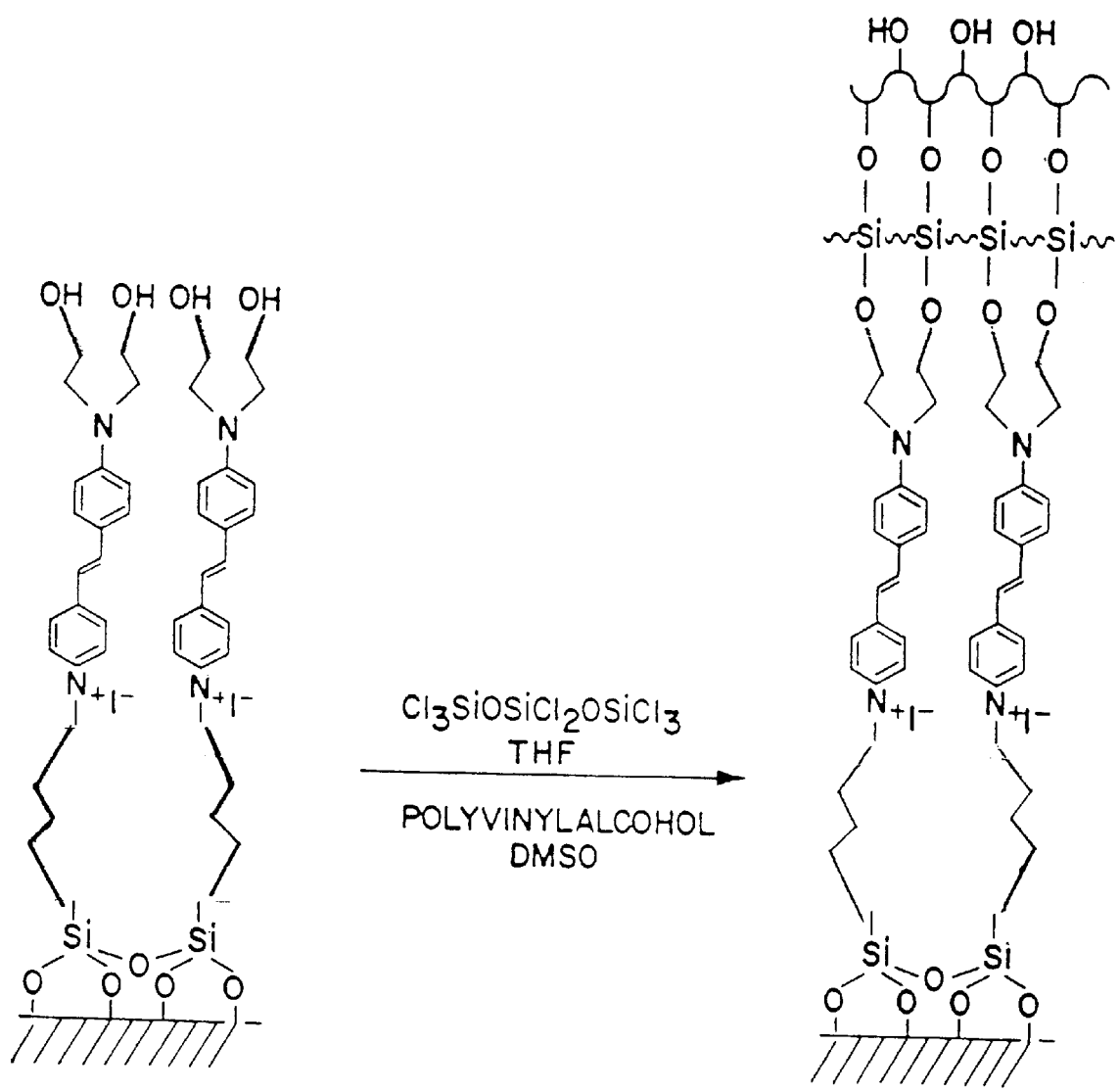

Coupling molecular functionalities into purposely oriented organized entities provides synthetic steric interlocking of the rod-like chromophore, but such interlocking is not strong enough to prevent large dipole-dipole interactions which will lead to randomization of orientation. In order to keep the chromophores "standing up" on the surface of the substrate, structural interlocking or crosslinking of the chromophore arrays into a three-dimensional network of structural layers are provided in a step subsequent to the formation of the chromophore layer. The structural layers may consist of bifunctional silicon reagents (Cl$_3$SiOSiCl$_2$OSiCl$_3$) in the preferred embodiment possibly combined with a polymer or any other polyfunctional reagent (polyvinylalcohol in the preferred embodiment) which helps to stabilize the structure (keeping the chromophore molecules "standing up"). Other silicon reagents could be SiX$_4$ compounds (X=halide, OR, NR$_2$ R=alkyl group C=1–10) or X$_3$Si—Y—SiX$_3$ reagents where Y is some bridging group such as a multifunctional alkyl (C=1–10), aryl, or metal organic group. Other polyfunctional reagents would be polyols (e.g., ethylene glycol), polyamines (e.g., ethylene diamine), and other polymers having reactive groups (olefin, etc.). This step involves double crosslinking of the chromophore layer surface with octachlorotrisiloxane in THF (Si layer) and is followed by reacting the freshly generated Si surface with polyvinylalcohol (PVA) in DMSO (PVA layer) to lock the chromophore orientations (FIG. 5). Such structural interlocking proves to be very effective in terms of preventing dipolar randomization.

Synthesis of Coupling Spacers

Trichlorosilanes are excellent silylating reagents and such would be a good choice for attachment to a hydrophilic surface. Since a pyridinium structure was chosen as the desired acceptor in the chromophore block, one needs a group that will form a bonding interaction in the form of a pyridinum salt. A suitable choice for this purpose is a benzylic or allylic halide. p-(Chloromethyl)phenyl trichlorosilane was selected as the first coupling reagent because it combines these two functionalities and because of the rigidity of the phenyl ring. Although benzyl chloride reacts readily with pyridine in solution, it is inert to the stilbazole structure on a surface because of steric limitations. Benzyl iodide can couple with pyridine readily at relatively mild conditions. Therefore, it would be desirable to use p-(iodomethyl) phenyltrichlorosilane. Unfortunately, this structure is subject to very fast exchange of benzylic and silyl halides (Reaction II).

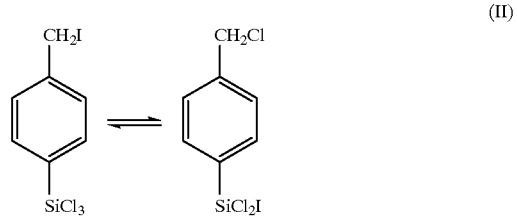

(II)

Advantage of the halide exchange reactions can be taken, however, to synthesize p-(iodomethyl) phenyltriiodosilane (Reaction III).

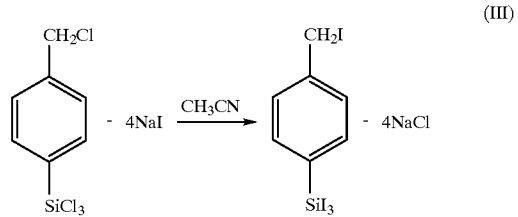

(III)

This is a very active species with a shelf life of about a few weeks, primarily because the Si—I bond is very weak and may react with all organic oxygen containing compounds. The rigidity of the phenyl ring introduces strong coupling between the self-assembled film and substrate. As a result, films prepared with this coupling reagent are unstable to laser radiation (SHG decays with time). In order to overcome these strong interactions between monolayers and substrates, a flexible spacer can be introduced. Commercially available 1-trichlorosilyl-2-(m, p-chloromethylphenyl) ethane can be converted to the corresponding iodo analog 1-triiodosilyl-2-(m, p-iodomethylphenyl) ethane by using the technique just described (Reaction IV). This new coupling reagent gives greatly improved film stability. Its analog, 1-dimethyliodosilyl-2-(m, piodo-methylphenyl) ethane, can also be prepared this way and its silylation ability is

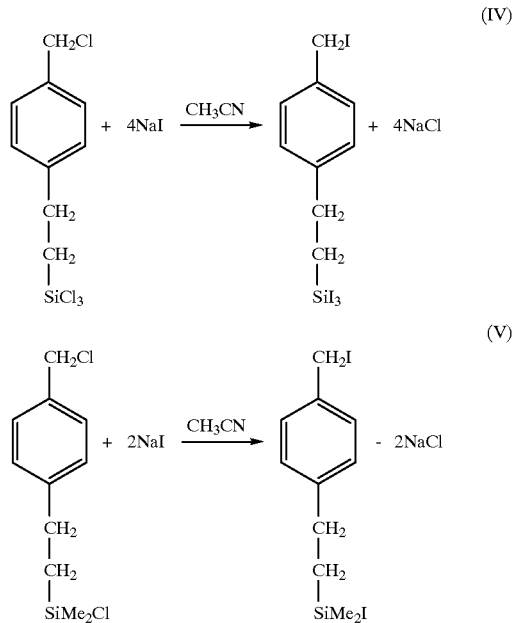

just as good as 1-triiodosilyl-2-(m,p-iodomethylphenyl) ethane (see Reaction V). These aromatic coupling reagents can be stored under argon in the dark for about two weeks prior to use, whereas aliphatic triiodosilanes are only good when generated in situ. These halide exchange reactions (III-IV) can be easily monitored by the shift of benzyl proton from $\delta=4.60$ ppm for chlorides to $\delta=4.44$ ppm for the iodides. Aromatic triiodosilanes are relatively more stable than aliphatic triiodosilanes. For the former, one obtains a nice NMR spectrum is obtained, whereas for the latter, NMR yields relatively broad lines indicating decomposition has already begun after 24 hours.

in dry methanol with Triton B Benzyl Trimethylammonium hydroxide as a catalyst, one obtains yellow crystalline diallylaminostyryl pyridine-N-oxide. The reason for using τ-picoline-N-oxide instead of τ-picoline is that τ-picoline is not sufficiently reactive with benzaldehyde and commonly it must be converted to a pyridinium salt before coupling it with the benzaldehyde. The pyridinium salt may then be hydrolyzed to obtain free base. This cyclic procedure is very inefficient and the total yield is very low. Treating the pyridine-N-oxide dye with excess 9-borabicyclononane (9-BBN) in THF, the desired molecular building block, bis(3-hydroxylpropylaminosyryl) pyridine is obtained. This reaction can be understood as a three step process. First 9-BBN adds to the allyl double bonds. The excess 9-BBN reduces the pyridine-N-oxide to pyridine, then by adding $H_2O_2$ and NaOH the boron-carbon bond is cleaved to yield the final product of bis(3-hydroxylpropylaminostyryl) pyridine. The absence of stilbazole-N-oxide in the final product can be conveniently monitored by the shift of $^1H$ NMR from 8.08 ppm to 8.44 ppm.

Coupling Layer Formation On Surfaces

Silica, defined as substances with the stoichiometric composition $SiO_2$, exists in various forms including hydrated species with the composition $SiO_2.H_2O$. The water is chemically bound in non-stoichiometric amounts.

The processes that can occur at the interfaces of silica and aqueous solution are very complex and difficult to interpret, and are critical to surface cleaning and self-assembling chemistry on the surface. Alkaline processes (NaOH aq.) are used herein because the amount of soluble silica remains nearly constant in acidic solution despite the varying degree of hydrolysis of $SiO_2$ on the surface. In the aqueous base solution, however, the solubility of silica increases dramatically due to the formation of silicate ions in addition to monosilic acid. This process will generate a fresh hydroxylated surface layer on the silica substrates while the siloxane bond on the surface is cleaved to form vicinal hydroxyl groups (Reaction VI). High surface hydroxyl densities on the silica glass can be obtained by sonicating the glass substrates in an aqueous base bath.

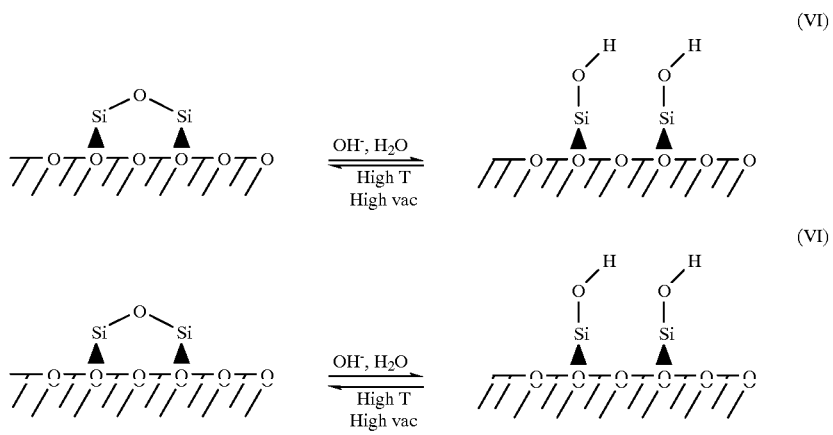

Synthesis of Chromophore Blocks

Figure 2A:
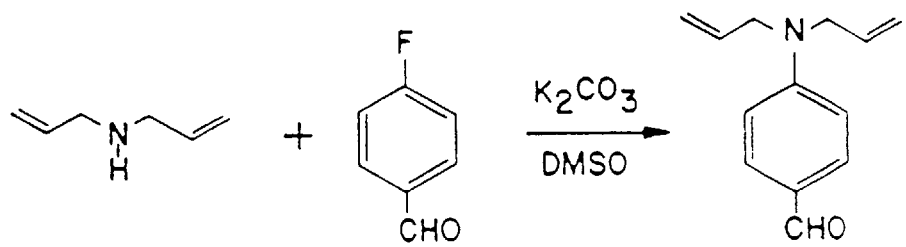
FIGS. 2(a), 2(b), 3(a), 3(b), 4(a), 4(b), and 5 show sequential steps in synthesis of the NLO material of the subject invention.
Figure 2B:
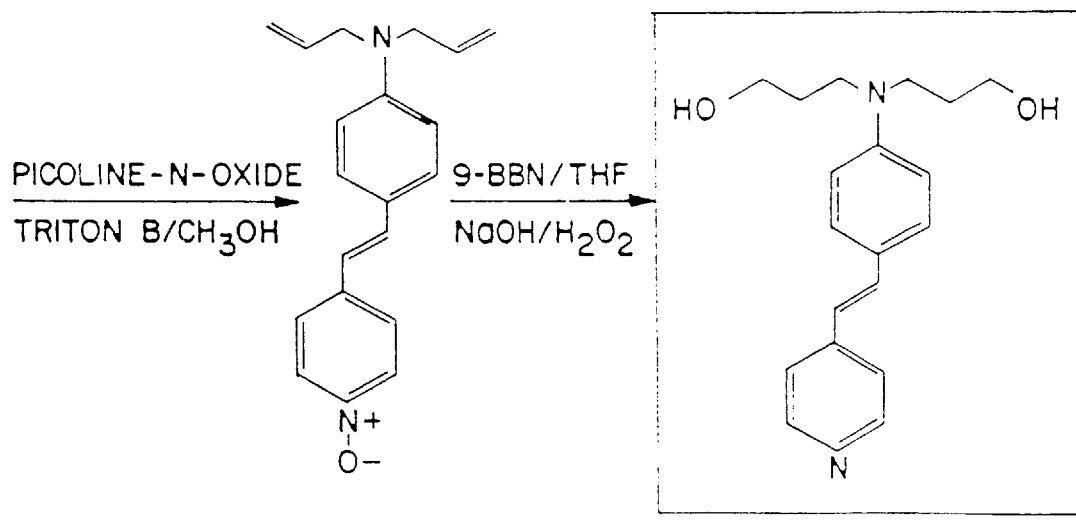

Synthesis of the structural chromophore building blocks is summarized in FIGS. 2(a) and 2(b). p-Fluorobenzaldehyde can be converted to diallylaminobenzaldehyde by refluxing with diallylamine in DMSO in the presence of $K_2CO_3$. By treating diallyaminobenzaldehyde with τ-picoline-N-oxide These substrates are desirable for silylation. Similar base treatment on other inorganic oxide surfaces such as ITO film ($In_2O_3.xSnO_2$) can also generate high hydroxyl densities on the surface. The hydroxyl groups on the surface will anchor and orient any molecules which have functionalities that can couple with hydroxyl groups (see FIGS. 3(a) and 3(b)).

Molecules such as organosilanes with hydrophilic functional groups can orient to form self-assembled monolayers on both sides of the glass surface. Organosilanes which have a general formula of $R_2SiX_{(4-n)}$ are ideal for the formation of molecular assemblies with their two classes of functionality. The halogen X is involved in the reaction with the surface of inorganic substrate, in which the hydrolyzable bond between X and silicon atom in the coupling agent is replaced by a covalent linkage with the inorganic substrate. The non-hydrolyzable organic group possess a latent functionality which will enable the coupling agent to link with an organic chromophore in subsequent steps.

Figure 3A:
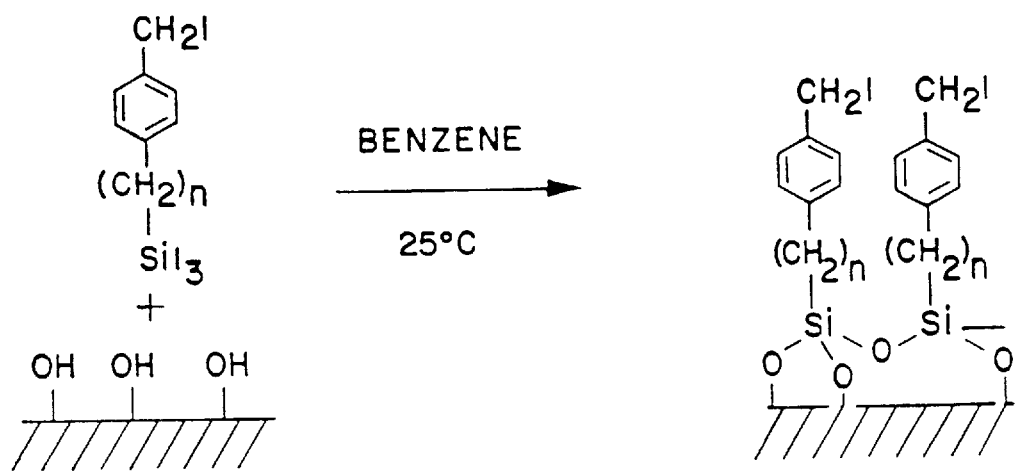
Figure 3B:
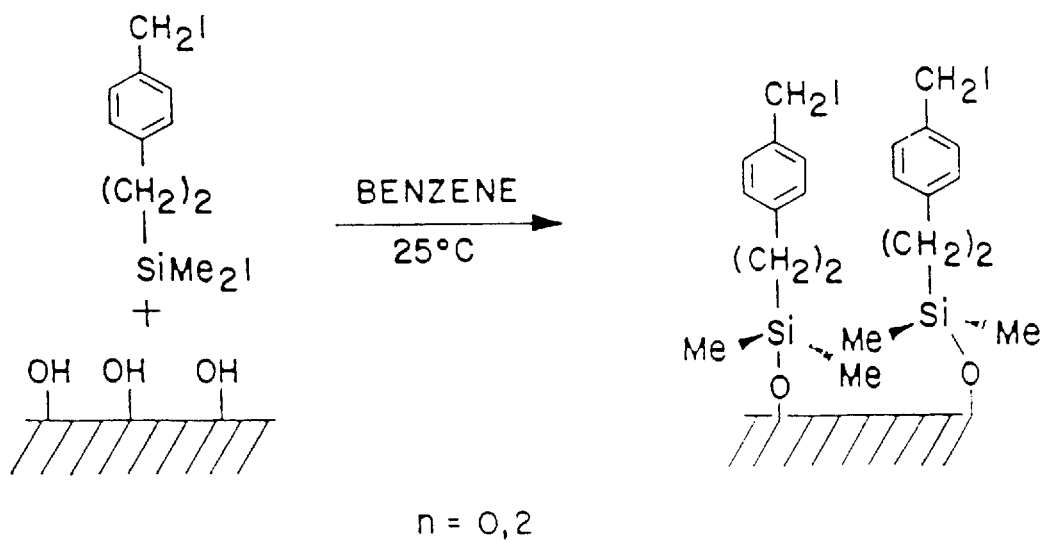

The coupling layer (Cp layer) is applied by immersing the freshly cleaned substrates into a benzene solution of 1-m, p-iodomethylphenyl-2-triiodosilylethane (see FIGS. 3(a) and 3(b)). It reacts smoothly with freshly generated hydroxyl groups on the various cleaned surface: $SiO_2$, ITO film ($SnO_2 \cdot xIn_2O_3$) Ge and Si. Typical substrates used in SHG measurements are soda lime glass and ITO glass because of their excellent transparency in the near-IR and visible regions. The completion of this coupling reaction can be verified easily by measuring the static advancing contact angle of the substrates before and after the reaction. Typically the change is remarkable from a cleaned smooth substrate with an advancing $\theta_a$ ($H_2O$) contact angle of ~15° with water to a silylated surface with a contact angle of approximately 82°. The reaction can be also monitored by measuring the electrical conductivity of the conductive ITO substrate before and after the reaction. Again, the presence of the organic monolayer is obvious because the conductive ITO surface becomes insulating after being silylated with silyl iodides.

Synthesis Of The Chromophore Layer

Figure 4B:
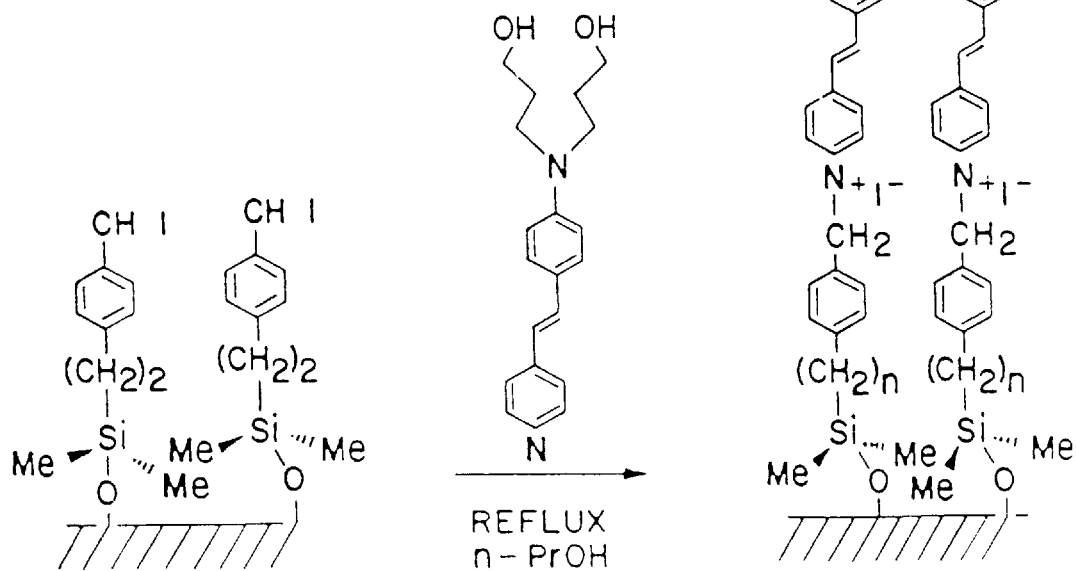

The chromophore layer (Ch layer) can be generated by refluxing the silylated substrates in a solution of n-propanol and p-bis(3-hydroxylpropyl)aminostyrylpyridine (see FIGS. 4(a) and 4(b)). The reason that p-bis(3-hydroxylpropyl) aminostyrylpyridine is chosen as the desired chromophore is that the pyridine group is bifunctional and has highly nonlinear optical properties.

The purity of 4-N(N,N-bis(3-hydroxyl-propyl) aminostyryl)pyridine is very important for chromophore layer formation and we have found that trace amounts of 4-[N,N-bis(3-hydroxylpropyl)aminostyryl]pyridine-N-oxide will hinder the chromophore layer formation reaction.

EXAMPLES

Solvents were freshly distilled prior to use. $CHCl_3$ and benzene were distilled over $P_2O_5$ twice and stored under argon. $CH_3CN$ was dried over 4 Å molecular sieves and then distilled over $CaH_2$ and stored under argon. THF was dried with KOH and then distilled and stored over KOH. DMSO and n-propanol were used without any pre-treatment. All chemicals are from Adrich Chemical Co. except the silanes which are obtained from Petrarch Systems Silanes and Silicones.

Proton and carbon magnetic resonance spectra were recorded on a Varian XL-400 MHz instrument. Mass spectral data were recorded on a Hewett-Packard 5985 GC/MS instrument with 70 eV ionizing voltage and direct injection technique.

Example 1 p-(Iodomethyl)phenyltriiodosilane

Under argon, NaI, 2.35 g (15.7 mmol) was dissolved in 15 ml pre-dried acetonitrile in a 100 ml flame-dried three neck flask equipped with a filtration apparatus. The whole apparatus was covered with aluminum foil because the iodide compounds are light sensitive. To this solution, p-chloromethylphenyltrichlorosilane 0.5 ml (2.6 mmol) was added with syringe. A white cloudy precipitate soon appeared, and the mixture was stirred overnight at room temperature (25°). Acetonitrile was next removed under vacuum. To the crude product, 20 ml pre-dried $CHCl_3$ was added and stirred for several hours. The resulting solid was filtered off and the resulting red solution was stored under Ar. $^1$H NMR($CDCl_3$) δ 7.72(2H, d, J=8.4Hz), δ 7.48 (2H, d, J=8.4Hz), δ 4.44 (2H, s).

Example 2

1-Triiodosilyl-2-(m, p-iodomethylphenyl) ethane

To a flame dried three neck flask equipped with a Schlenck filtration apparatus, under Ar 2.35 g (15.7 mmol) NaI and 15 ml dry $CH_3CN$ was added. When all NaI had dissolved, 0.57 ml (2.61 mmol) of 1-trichlorosilyl-2-(m, p-chloromethylphenyl) ethane was added. The mixture was stirred for 9 hours and then the $CH_3CN$ was removed in vacuo. About 20 ml dried benzene (or $CHCl_3$) was then syringed into the flask and the mixture was stirred for a few hours. The solid (NaI) was filtered off and the red solution was used immediately as the silylation reagent.

Example 3

1-Dimethyliodosilyl-2-(p, m-iodomethylphenyl) ethane

The title compound was prepared in the same procedure as that described for 1-triiodosilyl-2-(m, p-iodomethylphenyl) ethane.

Example 4 p-Diallylaminobenzaldehyde

Under an Ar atmosphere, 2.16 ml p-fluorobenzaldehyde and 3 ml DMSO were added sequentially to 3.5 g (30 mmol) of anhydrous $K_2CO_3$, 3.70 ml (20 mmol) diallylamine. With constant stirring, the mixture was heated to about 155–160° C. After refluxing for 20 hours, the solution became intense red. The mixture was cooled to room temperature and 10 ml distilled water was added to dissolve any inorganic salts and the product was extracted with ether. The water layer was washed with ether several times and the combined organic layers were dried over $MgSO_4$. The ether solution was then filtered and the ether, unreacted starting materials and solvent DMSO were removed by vacuum distillation at 100° C. A very viscous orange red product was left in the flask. Yield=2.05 g (51%). Mass spectrum: $M^+/e$=201. Calcd. $M^+/e$=201.27 Anal. calcd. for $C_{13}H_{15}NO$, C, 77.58; H, 7.51; N, 6.96. Found: C, 77.33; H, 7.33; N, 6.66. $^1$H NMR ($CDCl_3$), δ 9.71 (1H,s), 7.70 (2H, d, J=9Hz), 6.70 (2H, d, J=9Hz), 5.82 (2H, m), 5.19 (4H, m), 4.00 (4H,t). $^{13}$C NMR ($CDCl_3$) δ 189.4, 152.8, 131.8, 116.8, 110.9, 52.22 ppm.

Example 5 p-Diallylaminostyrylpyridine-N-oxide

To 6.5 g (60 mmol) of τ-picoline-N-oxide in a 250 ml three neck flask, 10 g (50 mmol) of diallylaminobenzaldehyde in 60 ml dry methanol and 23 ml Triton B were added sequentially. The red solution was refluxed for 8 hours under a positive pressure of Ar and then the refluxing apparatus was replaced with vacuum distillation apparatus. Methanol was completely removed by vacuum. The mixture appeared yellow initially when it was dry and then it became dark after about one hour. The mixture was taken up in 100 ml $CH_3OH$ and stirred constantly until all products dissolved. The resulting solution was then poured into 1000 ml distilled water. A cloudy yellow precipitate appeared immediately, which slowly changed to an orange colored solution with a red sticky liquid-like product on the bottom of the beaker. The mixture was left overnight to allow complete precipitation. If the diallylaminobenzaldehyde is very pure, yellow crystals will be formed the next day instead of red sticky product on the bottom of the beaker. (a) If yellow crystals were formed, they were filtered off and recrystallized twice from chlorobenzene: hexane (1:4). (b) If a red sticky product was formed, the water-methanol solution was carefully decanted and the red-sticky liquid was washed with more water. The red viscous liquid soon began to solidify at room temperature in the hood. After complete solidification, the red product was dissolved in about 150 ml chlorobenzene. The resulting red solution was filtered and 500 ml hexane added to the filtrate. This solution became cloudy immediately and gave yellow crystals upon standing. The product was recrystallized once again from chlorobenzene/hexane. Yield=4.8 g(33.2%). Mass spectrum: $M^+/e=292$. Anal. Calcd. for $C_{19}H_{20}N_2O_1$ C, 78.05; H, 6.89; N, 9.58. Found: C, 77.96; H, 6.89; N, 9.43. $^1H$ NMR δ 8.09 7.34 (2H, d, J=8.8 Hz), 7.26 (2H, d, J=7.2Hz) 7.04 (1H, d, J=16Hz) 6.67 (1H, d, J=16Hz) 6.66 (2H, d, J=8.8Hz) 5.81 (2H, m), 5.17 (4H, m), 3.95 (4H, t). $^{13}C$ NMR ($CDCl_3$) δ 149.2, 145.8, 145.9, 133.6, 133.4, 128.4, 128.4, 125.0, 124.3, 124.1, 121.5, 116.3, 112.2, 52.70.

Example 6 p-Bis(3-hydroxylpropyl)aminostyrylpyridine

To 0.48 g (1.64 mmol) of diallylaminostyryl-pyridine-N-oxide, under Ar atmosphere, 15 ml 0.5M 9-BBN (7.5 mmol) in THF solution was injected into the three neck flask with a syringe. The solution became red immediately. After stirring it overnight, it changed into dark red. The flask was next cooled in an icebath and 3 ml 3M NaOH (9 mmol) solution (water) was added, followed by the dropwise addition of 3 ml 30% $H_2O_2$ (2.94 mmol) over a period of 20–30 minutes. The dark red solution became light-orange and transparent after the addition of the hydrogen peroxide. The light-colored solution was then poured into a saturated aqueous $K_2CO_3$ solution. The aqueous layer was extracted three times with THF and then the combined THF solution was dried over $MgSO_4$ for several hours. The drying reagent was filtered off and the THF removed by vacuum. Under Ar, about 300 ml toluene was added to crude product and the mixture heated to reflux temperature, followed by a quick hot filtration. After cooling slowly to room temperature, tiny yellow crystals precipitated out from toluene. Typically, the crude product was recrystallized several times from toluene until nice yellow crystals were obtained and finally recrystallized from 20–30 ml $CHCl_3$. Yield=0.17 g (33.1%). High resolution mass spectrum, $M^+/e=312.1852$; Calcd. for $C_{19}H_{24}N_2O_2$, $M^+/e=312.1838$. $^1H$ NMR (DMSO), δ 8.44 (2H, d, J=6Hz), 7.44 (2H, d, J=6Hz), 7.42 (2H, d, J=9.2Hz), 7.38 (1H, d, J=16.4Hz), 6.88 (1H, d, J=16.4Hz), 6.69 (2H, d, J=9.2Hz), 4.56 (1H, t, J=16.4Hz), 3.44 (4H, t, J=6Hz), 3.37 (4H, t, J=7.6Hz), 3.34 (1H, s), 3.31 (1H, s), 1.67 (4H, m) Anal. Calcd. for $C_{19}H_{24}N_2O_2 \cdot 0.5H_2O$, C, 71.00; H, 7.84; N, 8.72. Found: C, 71.52; H, 7.69, N, 8.55. λmax=390 (in MeOH).

Substrate Cleaning

Soda lime glass and ITO coated glass substrates were sonicated first in aqueous 10% detergent (Liqui-Nox) water solution for ten minutes and then in aqueous NaOH for another ten minutes. The substrates were then thoroughly rinsed with distilled water and AR grade acetone followed by several hours of oxygen plasma cleaning (Harrick Scientific Co.). Silicon wafers can be cleaned in the same manner. Aqueous solutions of NaOH and KOH have little effect on the surface of germanium, and concentrated nitric acid attacks it only superficially. For the Ge ATR prisms, nitric acid is used to treat the germanium crystal surfaces to generate germanium surface oxides and hydroxides. The subsequent cleaning procedures are the same as those described for glass substrates.

Example 7

Coupling Layer Formation (Cp Layer)

Under an Ar atmosphere, the freshly cleaned substrate (substrates were used within one or two days after cleaning) was immersed into a toluene solution of 3-iodopropyltrimethoxysilane.

It is very important to ensure that both sides of the substrate are not blocked and have good contact with the solution. After 24 hours, the substrate was transferred into benzene solution for cleaning purpose. The substrate is sonicated in benzene solution for three times and then sonicated in acetone for three times with one minute duration of each sonication. $\theta_a (H_2O)=74°$, XPS shows: Si, O, C, and I present on the surface.

Example 8

Chromophore Layer Foundation (Ch layer)

Under argon flush, the silylated substrate was immersed in a solution of $5\times10^{-3}$ M4-(N,N-bis(3-hydroxylethylamino-styryl)pyridine in toluene. It is very important to ensure both sides of the substrate are clear of any possible hindrance and to give a good contact between the surface propyliodide groups and the corresponding coupling functionalities in solution. The solution was kept refluxing for 48 hours to ensure full coverage of chromophore layer. After cooling the reaction vessel to room temperature, the substrate was rinsed with acetone followed by sonication in acetone for a few times (1–2 minutes for reach sonication). $\theta_a (H_2O)=55°$. XPS shows Si, O, C, N, and I present on the surface (initial diminution of Si, O signal; growth and persistence of C, N, I signals in the subsequent multilayer structure). UV-vis spectrum: λ=490 nm, 260 nm, and 195 nm. FTIR-ATR: 2960 $cm^{-1}$ (m), 2935 $cm^{-1}$ (m), 2869 $cm^{-1}$ (m), 2855 $cm^{-1}$ (m), 1579 $cm^{-1}$ (v), 1521 $cm^{-1}$ (v), 1453 $cm^{-1}$ (v), 1371 $cm^{-1}$ (v), 960 $cm^{-1}$ (v), 879 $cm^{-1}$ (v), 613 $cm^{-1}$ (v).

Example 9

Silicon Layer Formation (Si Layer)

The CPCH covered substrate was sonicated 5 times for 2 minutes in dry THF to remove any possible water and alcohol molecules which might have been physically absorbed on the surface. The substrate was then immersed into a 1M solution of octachlorotrisiloxane and THF, followed by sonication for about 10 minutes to promote uniform distribution of the reagents onto the surface. $\theta_a (H_2))=17°$, FTIR-ATR studies show the appearance of very strong absorbances at 1205 $cm^{-1}$ and 1072 $cm^{-1}$ from Si—O—R and Si—O—Si vibration modes respectively.

Example 10

PVA Layer Formation (PVA Layer)

After coating the Si layer, the substrate was cleaned by sonicating in dry THF to remove any residual siloxane physically absorbed on the surface. The substrate was then dipped into a solution of PVA in DMSO (0.5 g PVA/15 ml DMSO). The crosslinking reaction was allowed to proceed for 10 minutes with ultrasound. The substrate was then sonicated in pure DMSO to remove extra PVA on the surface and finally the DMSO was removed by sonicating the substrate in acetone. $\theta_a$ ($H_2O$)=17°. FTIR-ATR 2962 $cm^{-1}$ (m), 2932 $cm^{-1}$ (m), 2900 $cm^{-1}$ (sh), 2881 $cm^{-1}$ (m), 2855 $cm^{-1}$ (sh), 1217 $cm^{-1}$ (vs), 1081 $cm^{-1}$ (vs).

The above processes, i.e., sequential formation of the Cp, Ch, and structural layer formation, is repeated until a multilayer structure is built up. Thus, the coupling layer is reacted with the structural layer (which now serves as a substrate), chromophore is added and then the structural layer, and so on.

An alternative procedure for preparing the self-assembled thin films is also available. In summary, clean glass substrates are immersed in a toluene solutions of 3-iodopropyltrimethoxysilane (coupling agent) at 110° C. for 6 h, and the resulting monolayers are than air-cured at 115° C. for 30 minutes. Chromophore deposition is carried out by immersion of these functionalized substrates in toluene at 110° C. for 12 hours. Evolution of the surface structures is monitored by contact angle measurements which repeat in the sequence: original glass surface, 15°; coupling agent monolayer, 74°; chromophoric monolayer, 46°; capped monolayer, 20°; and are in accord with expected surface wettabilities; by UV-V is spectroscopy which reveals large shifts in λmax upon quaternization (from 390 to 490 nm); by polarized second harmonic generation, and also by grazing angle X-ray reflectivity. These films are insoluble in common organic solvents and most acids, and can only be removed by etching with HF solutions or by diamond polishing.

Waveguide Preparation

Stilbazolium-based self-assembled monolayers were assembled on both sides of a fused silica slide, and the film was subsequently removed from one side with a 20% HF solution to avoid interference effects in the dispersion measurement. The $\lambda_{zzz}^{(2)}$ value at 1.17 eV of 5×10−7 esu remains unchanged after the etching treatment. The chromophore tilt angle from the surface normal was determined by fitting the angular dependent SHG signal envelope to eq (1). The tilt angle, ψ=42±2°, remains $$\frac{\chi_{zzz}^{(2)}}{\chi_{zxx}^{(2)}} = 2\cot^2\overline{\psi} \quad (1)$$

unchanged before and after removing the film from one side of the substrate. The chromophore number density on the surface, $N_s$, is computed by the use of eq (2). This yields $N_s$=3×10$^{14}$ molecules/cm$^2$ where $6_{zzz}$ is $$\chi_{zzz}^{(2)} = N_s(\cos^3\overline{\psi})\beta_{zzz}$$

the calculated magnitude (9.4×10$^{28}$ cm$^5$esu$^1$) of the hyperpolarizability component along the chromophore long axis (which is comparable to the estimated experimental value[8] of 8.3×10$^{28}$ cm$^5$esu$^1$).

For waveguiding experiments, self-assembled NLO multilayers were coated with a 0.8 μm layer of polystyrene (MW=280,000) by spin coating a 7% THF/toluene (1:2) polymer solution. The remaining solvent was removed by baking the polymer at 100° C. in a vacuum oven for 12 hours. The SHG signal and the chromophore tilt angle remained unchanged after the polymer coating process. The fused quartz substrate was cut into a 5×25 mm rectangle.

The waveguide of the subject invention incorporates the combination of a polymer film with a number of self-assembled monolayers in a multicomponent linear material/nonlinear material waveguide. In the present concept, the self-assembled monolayers comprise the nonlinear region of the guide and thicker linear layer, having a refractive index similar to that of the self-assembled material is deposited on the nonlinear material. The linear guide material, must have a higher refractive index than the substrate and any cladding material that is incorporated. Its purpose is to add to the total guide thickness and to propagate light of all frequencies utilized without absorption on scattering losses. Suitable linear materials include organic isotropic polymers such as: polystyrene, polyimides, polycarbonates, etc., and other non-polymeric (low molecular weight) glassy materials; and anisotropic polymers, liquid crystal polymers (LCP), including main-chain, side-chain, and discotic LCP or binary mixtures of low molecular weight liquid crystal with isotropic or anisotropic polymers. Low temperature forming inorganic glasses i.e., glass materials which can be deposited in thin film form and have sufficiently high index e.g., sol-gel, molecular beam epitaxy, sputtering, etc. are also suitable. LCP materials have the added advantage that their linear optical properties (refractive index) can be readily controlled and modified by electric or magnetic fields, providing increased flexibility in the design of optical switches and modulators, and adding an element of control to frequency conversion waveguides as well.

A wide variety of individual designs for frequency conversion are possible with this approach. A single region of self-assembled NLO material, composed of 1 or more monolayers, can be situated on either surface of a linear waveguide. In this case, all waveguide mode dispersion degeneracies between fundamental and harmonic modes have significant overlap integrals and therefore can be utilized for frequency conversion. This feature is a result of having all of the NLO activity concentrated in a small region where the polarity of the electric fields is uniform. Mode crossings between two even order modes can benefit from an NLO layer deposited on both surfaces because the electric field polarity is in this case of the same polarity at both surfaces for both modes. Other specific mode crossings can benefit most from the NLO layer situated in the center of the guide, if the fields are highest here. This can be accomplished by depositing a linear thin film of roughly half the desired thickness and depositing self-assembled film(s) before adding the remaining linear guide thickness. These approaches demonstrate the versatility and flexibility of the concept of placing highly nonlinear self-assembled films throughout optical waveguide structures composed primarily of optically linear materials. The approach is equally flexible in designing optical switches and optical modulators, which rely on the control of the optical path length of light propagating in a waveguide. The electro-optic response of self-assembled films can be used to adjust the dielectric function with applied electric fields. Self-assembled layers situated at interfaces can contribute significant changes in the Goos-Hanchen phase shift by variation in their dielectric properties, as well as standard bulk effects from thicker regions of self-assembled films located anywhere in the waveguide structure. In this way the extremely high optical nonlinearity of self-assembled monolayers can be used in the design of efficient switches and modulators as well as frequency conversion devices.

One strength of this approach in frequency conversion lies in the very large increase of NLO process conversion efficiency with an increasing number of self-assembled layers. The location of the NLO active region near the surface of the guide has the advantage of reasonable mode profile overlapping for most mode crossovers, regardless of the number of nodes in the waveguide mode profile. All of the NLO-active region contributes energy to the second harmonic mode, provided its thickness is less than the location of the node in the harmonic mode, avoiding the common problem of competing regions with different phases caused by the reversal of the relative sign of the electric field. Only TM modes, which take full advantage of the $\chi_{zzz}^{(2)}$ component of the second order electric susceptibility tensor. If no cladding overlayer is deposited on the guide surface, the substrate will generally have a refractive index much closer to that of the guiding materials than the vacuum cladding, leading to higher electric fields at this interface. In this case, self-assembled layers situated between the substrate and the linear guide lead to the highest frequency conversion efficiencies. Due to the high nonlinearity of the self-assembled monolayers, an extremely thin layer can produce significant SHG response in this configuration.

Figure 6A:
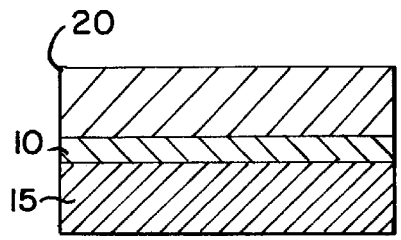
FIGS. 6(a), 6(b), 6(c) and 6(d) are schematic depictions of a waveguide of the subject invention.
Figure 6B:
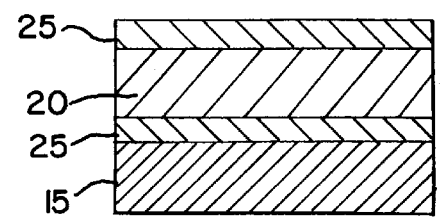
Figure 6C:
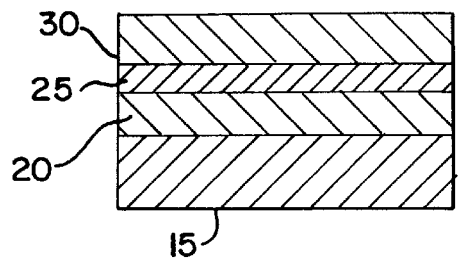
Figure 6D:
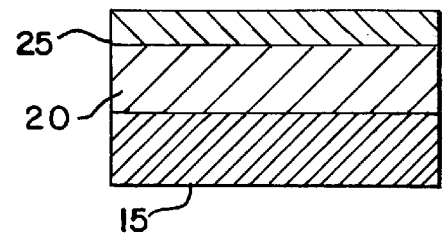

The linear material of the subject invention may be combined with the non-linear material on a substrate as shown in FIGS. 6(a)–6(d). FIG. 6(a) represents a device having an optically non-linear self-assembled multilayers 10 formed on a substrate 15. An optically linear polymer layer 20 is formed on the nonlinear layer 10. FIG. 6(b) shows a second structure where an additional self-assembled non-linear multilayer 25 is formed on linear layer of the device of FIG. 6(a). In FIG. 6(c) the optically linear layer 20 is formed on the substrate 15, a non-linear layer is formed on the non-linear layer and capped with another linear layer 30. FIG. 6(d) shows a device having optically linear layer 20 on a substrate 15 and capped with self-assembled nonliner multilayer 25.

In the above structures (FIG. 6(a)–FIG. 6(d)) it is important to note that $\chi^2$ of the NLO material must be higher than $5 \times 10^{-7}$. The NLO layer must be self-assembled and be less than 10% of the thickness of the linear material with a minimum thickness of at least 25 Å.

The choice of linear guiding material must satisfy the requirements of all optical waveguides. It must be transparent over the operating wavelengths involved. It must be available in thin film form, with precise control of thickness and uniformity. It must also have a higher refractive index than surrounding substrate and cladding materials. It is advantageous to use materials which are strong and insensitive to common processing conditions such as high temperatures. Many polymer materials can be used with self-assembled layers in waveguide devices. Polymers are relatively easy to prepare in thin film form. Many oxides such as $Al_2O_3$, $TiO_2$, $TaO_3$, and rutile glass can also be used. Most of these can be prepared in thin film form by sputtering or CVD techniques. Commercial high index glasses such as those manufactured by Schott Glass Inc. can be deposited in thin films by pulsed laser ablation. All of these materials have sufficiently high refractive indices and adequate optical quality for use with self-assembled films in nonlinear optical waveguide structures.

Waveguide Preparation

A waveguide device having the structure of FIG. 6(a) is prepared through self-assembly as set forth in Examples 1–10 on a substrate of quartz cleaned and surface prepared as set forth above. The process is repeated until total thickness of the self-assembled monolayer is 25 Å or greater. A linear guide of polystrene (mw=280000) is spin-coated on top of the self-assembled multi-layer to a thickness of 8 microns. High SHG efficiencies with $\chi_{zzz}^{(2)}$ values for the 25 Å monolayers of $5–7 \times 10^{-7}$ esu at $h\omega=1.17$ eV are observed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. An optically nonlinear hybrid waveguide comprising:
   a) a substrate;
   b) a self-assembled film chemically bonded to said substrate, said film comprising:

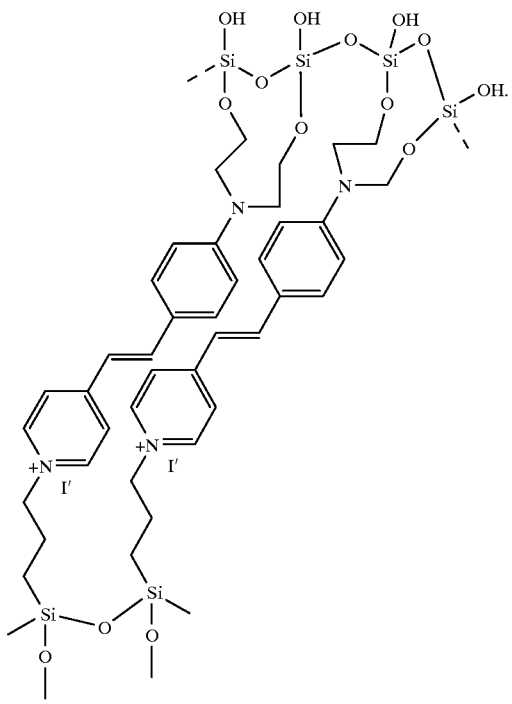

c) a transparent linear guide film chemically bonded to said self-assembled film, said linear guide film having an index of refraction greater than said substrate.

2. The waveguide of claim 1 wherein said transparent linear guide film comprises a material selected from the group consisting of polystyrene, polycarbonate, polyimides and liquid crystal polymers.

3. A nonlinear optical material comprising:
   a defined substrate having a certain refractive index;
   a silane coupling means chemically bonded to said substrate;

a stilbazolium chromophore chemically bonded to said coupling means; said coupling means and chromophore forming chromophore arrays on said substrate; and a structural layer chemically bonded to chromophore arrays, said chromophore arrays forming a three-dimensional nonlinear optical material, and said structural layer comprising a transparent linear guide material having a refractive index higher than the substrate refractive index.

4. The nonlinear optical material of claim 3 wherein said structural layer is a material selected from the group consisting of polystyrene, polyimide, polycarbonate, and glassy materials.

5. An optically non-linear hybrid waveguide comprising:

a) a substrate;

b) a self-assembled film deposited on said substrate, said self-assembled film including a monolayer having chromophores chemically bonded to 3-iodopropyltrimethoxysilane on said substrate; and c) a transparent linear guide film chemically bonded to said self-assembled film and having an index of refraction higher than the index of refraction of said substrate.

* * * * *

UNITED STATES PATENT AND TRADEMARK OFFICE
CERTIFICATE OF CORRECTION

PATENT NO : 6,033,774
DATED : March 7, 2000
INVENTOR(S): Yitzhaik et al.

It is certified that error appears in the above-identified patent and that said Letters Patent is hereby corrected as shown below:

In the Patent, Column 1, after the Title, should read

-- This invention is made with government support under Grant No. DMR-9120621 awarded by the National Science Foundation and Grant No. 94-0169 awarded by the Air Force. The government has certain rights in the invention. --

Signed and Sealed this

Second Day of January, 2001

Attest:

Attesting Officer

Q. TODD DICKINSON

Commissioner of Patents and Trademarks